United States Patent [19]
Suominen

[11] Patent Number: 6,086,732
[45] Date of Patent: Jul. 11, 2000

[54] FLOCK SEPARATING APPARATUS

[75] Inventor: Hannu L. Suominen, Helsinki, Finland

[73] Assignee: BCDE Group Waste Management Ltd Oy, Helsinki, Finland

[21] Appl. No.: 09/280,140

[22] Filed: Mar. 26, 1999

Related U.S. Application Data

[63] Continuation-in-part of application No. 08/836,849, May 19, 1997, Pat. No. 5,888,359.

[30] Foreign Application Priority Data

Nov. 18, 1994 [FI] Finland ............... PCT/FI94/00518

[51] Int. Cl.[7] .............. C25B 15/00; C25B 9/00; B01D 9/00
[52] U.S. Cl. ............... 204/232; 204/240; 204/275; 204/276; 422/255
[58] Field of Search ................. 204/232, 240, 204/275, 276; 205/742, 755, 757; 422/255, 261

[56] References Cited

U.S. PATENT DOCUMENTS 1,099,396  6/1914  Rothwell ............... 210/221.2
4,101,409  7/1978  Austin .................. 204/277
4,294,697  10/1981 Sawa et al. ............ 210/221.1
4,623,436  11/1986 Umehara ............... 204/149
4,673,494  6/1987  Krofta .................. 210/202
4,834,872  5/1989  Overath ................ 210/151

FOREIGN PATENT DOCUMENTS

WO 93/04003  4/1993  WIPO .

OTHER PUBLICATIONS

Patent Abstracts of Japan, vol. 9, No. 260, C–309, JP A60–110389, Takasayashi, Sludge concentrating Method, Jun. 15, 1985.
Journal WPCF, vol. 54, No. 12, John R. Bratby, treatment of Raw Wastewater Overflows By Dissolved–Air Flotation, Dec. 1982, pp. 1558–1565.

*Primary Examiner*—Kathryn Gorgos
*Assistant Examiner*—Thomas H Parsons
*Attorney, Agent, or Firm*—Hill & Simpson

[57] ABSTRACT

A flock separating apparatus, has an electrolytic cell (2) fitted with iron electrodes and a separating tank (3), wherein the flock is carried upwards by a hydrogen gas produced in electrolysis. The separating tank (3) has a substantially vertical pipe having a length which is at least 10 times, preferably at least 15–20 times more than its diameter.

8 Claims, 2 Drawing Sheets

FLOCK SEPARATING APPARATUS

This is a continuation-in-part of application Ser. No. 08/836,849, filed May 19, 1997 (now U.S. Pat. No. 5,888,359), which was a National Stage of International Application No. PCT/FI94/00518, filed Nov. 18, 1994.

BACKGROUND OF THE INVENTION

The present invention relates to a flock separating apparatus for use in sewage or sludge treatment, comprising an electrolytic cell and a separating tank, into which the flock developed in the electrolytic cell is delivered and in which the flock rises up through the action of a gas produced in electrolysis.

The treatment or purification of sewage and industrial process waters is conventionally (e.g. International Reference WO 89/06161) carried out by using flock separating tanks with air blown therein, so that the rising air bubbles carry the lighter solids to the surface as flock which can be removed. For example, the Patent publications U.S. Pat Nos. 4,673,494 and 4,294,697 disclose such a combination of an electrolytic cell and a separating tank such that the electrolytically produced flock can be brought up to the surface in the separating tank by means of a gas released in electrolysis. Such a combination does not allow the use of optimal cell and tank structures and dimensions, resulting in a poor separation efficiency. The prior known flock separating tanks are relatively shallow and have been aimed at a relatively large surface area.

SUMMARY OF THE INVENTION

An object of the invention is to provide an improved flock separating apparatus, wherein the flock rising speed and a resulting separation efficiency have been substantially increased when compared to the prior known equipment.

This object is achieved according to the invention in such a manner that the separating tank comprises a substantially vertical pipe, separated from an electrolytic cell and having a length which is at least 10 times, preferably at least 15 times more than its diameter, and that a feed or supply pipe extending from the electrolytic cell to the separating pipe opens below the mid-point of the separating pipe, said separating pipe having its bottom end connected to a treated-water receiving and discharge tank and its top end rising above the surface level of said receiving and discharge tank.

Thus, an important point in the invention is that a hydrogen gas produced in electrolysis is used for carrying the flock up in a narrow pipe with a high hydrostatic pressure and a high flow rate. Because of a high flow rate, the hydrogen gas adhered to flock particles does not have enough time to separate and, thus, the hydrostatic pressure in a high separating space produces a high rising speed for flock particles. On the other hand, the receiving and discharge tank with a sufficiently large surface area makes sure, according to the principle of communicating vessels, that the water contained in the separating pipe does not pursue a high rising speed and comes virtually to a halt at the water level of said receiving and discharge tank. Thus, the discharging flock carries along a minimal amount of water.

Although the bottom end of the separating pipe could open directly within the opening area of the supply pipe, the separating pipe can be extended downwards e.g. for positioning a sand filter in such a manner that typically about ½–⅛ of the separating pipe length is located below the supply pipe opening area.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
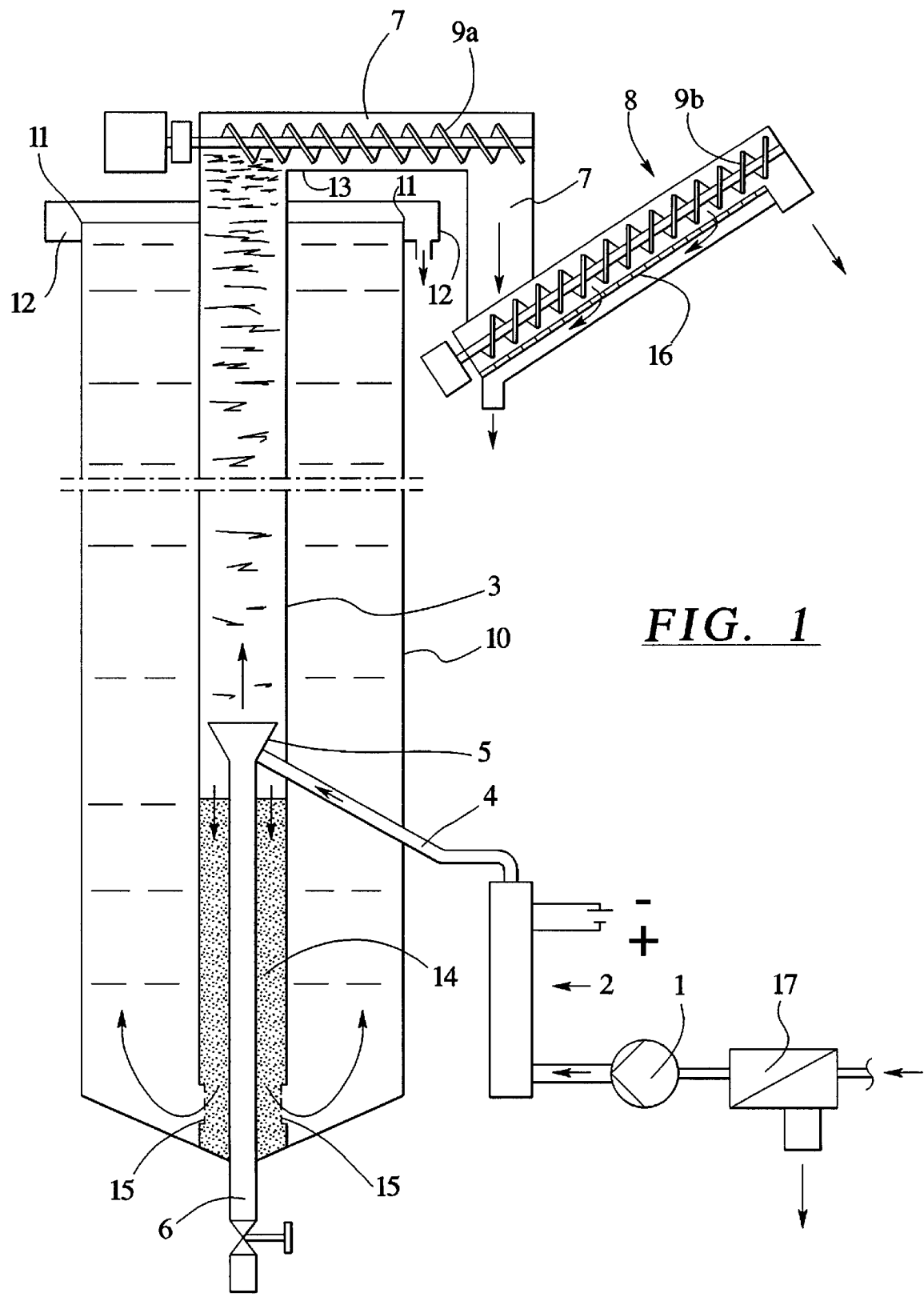
FIG. 1 depicts a flock separating apparatus according to the present invention.

The water or sludge subjected to a purification treatment is delivered through a coarse matter separator 17 and supplied by a pump 1 through an electrolytic cell 2 into a separating pipe 3 (see FIG. 1). The cell 2 is provided e.g. with iron electrodes for passing therebetween the water or sludge to be treated. The electrodes are supplied with a direct current, the cell being subjected e.g. to the following reactions:

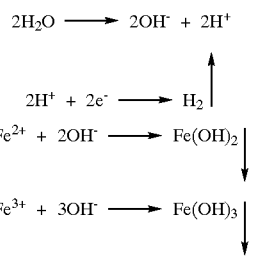

The developing hydrogen gas adheres to ferro- and ferrihydroxide deposits, which are in turn producing a web or mesh structure for trapping solid impurities. This way, the solid matter flocculates and the flock-adhered hydrogen gas makes the flock lighter than water.

Naturally, the iron electrodes can be replaced with other metal electrodes as well. In addition or instead of hydrogen, the electrolysis may produce other gases as well depending on a liquid to be treated.

The supply pipe 4 opens into a cone 5 included in the separating pipe 3 and is provided at its bottom end with a pipe 6 for collecting and removing heavy objects, such as small rocks. The flock particles begin to rise from the cone 5 upwards in the pipe 3 at quite a high climbing speed. At the top end of said pipe 3 the flock particles pack into a froth-like flock deposit which is forced by a screw conveyor 9a into a flock discharge pipe 7. The pipe 7 carries the flock to a solids separator 8, such as e.g. a filter web, a screw press, a separator, a centrifuge or the like. In the illustrated case, the separator 8 includes a chute-like filter web 16 and a conveyor screw 9b on top of it. The solid matter can be carried e.g. to a composter and the liquid can be returned back to the intake side of the pump 1.

In the illustrated case, the separating pipe 3 extends also downwards from the cone 5 and, thus, it can be fitted with a sand filter 14. The treated water has a passage through ports 15 into a receiving and discharge tank 10 having a surface area which is multiple compared to that of the separating pipe 3. By virtue of this, the climbing speed of water in the separating pipe 3 decelerates in relation to the flock climbing speed for a further improved separation efficiency. In some cases, the tank 10 may simultaneously serve as a storage bin for a liquid to be treated.

Between the inlet of the supply pipe 4 and the ports 15 said separating pipe 3 experiences a flow downwards, the flow rate corresponding to a runoff over an edge 11 into a discharge chute 12. The section of the pipe 3 located below the cone 5 can be replaced with a filter cloth bag for a simpler construction.

The height difference between the overflow edge 11 and a flock discharge edge 13 included in the receiving and discharge tank 10 can be made adjustable e.g. by providing the pipe 3 with a telescopic top end. By adjusting the top end of the pipe 3 (and the pipe 7) downwards it is possible to receive wetter flock more quickly. Thus, the overflow edge 11 must be located slightly below the level of the flock discharge edge 13 but a substantial distance above the inlet of the supply pipe 4. Since the pipes 10 and 3 operate on the principle of communicating vessels, the height difference therebetween must be adjusted or balanced in such a manner that both experience overflow and the height difference is caused or determined by the fact that the flock contained in said separating pipe 3 is lighter than water as a result of the hydrogen gas adhered thereto. Thus, the overflow equilibrium for communicating vessels is achieved by means of vessels having different heights.

The top end of the separating pipe 3 can be provided with a duct for the discharge of hydrogen gas. In major plants, the hydrogen gas can be recovered. It is also possible to recycle the hydrogen gas back into the separating pipe 3 below the cone 5. Of course, it is possible to supply compressed air to the bottom end of the pipe 3 or to include a sand filter 14 in the bottom end of the pipe 3 below the cone 5. The necessity of these extra arrangements depends on an intended application. The invention can be exploited both in a small and a large scale operation. The possible largescale applications include both industrial waste waters and community sewage. The possible smaller scale applications include e.g. agricultural farms.

In major plants, it is possible to connect several pieces of such equipment in line e.g. such that the top ends of separating pipes 3 included in different pieces of equipment are connected to a common flock discharge pipe 7.

The invention has already been practically tested in the purification treatment of liquid manure in a hog farm. Hence, it was found out that the great length of separating pipe 3 in relation to the diameter is a particularly critical factor in view of securing a sufficient. climbing speed and separation efficiency. In addition, the large surface area of tank 10 in relation to the surface area of pipe 3 was found advantageous in that water separates effectively from flock instead of pursuing to rise into the flock discharge pipe 7.

Figure 2:
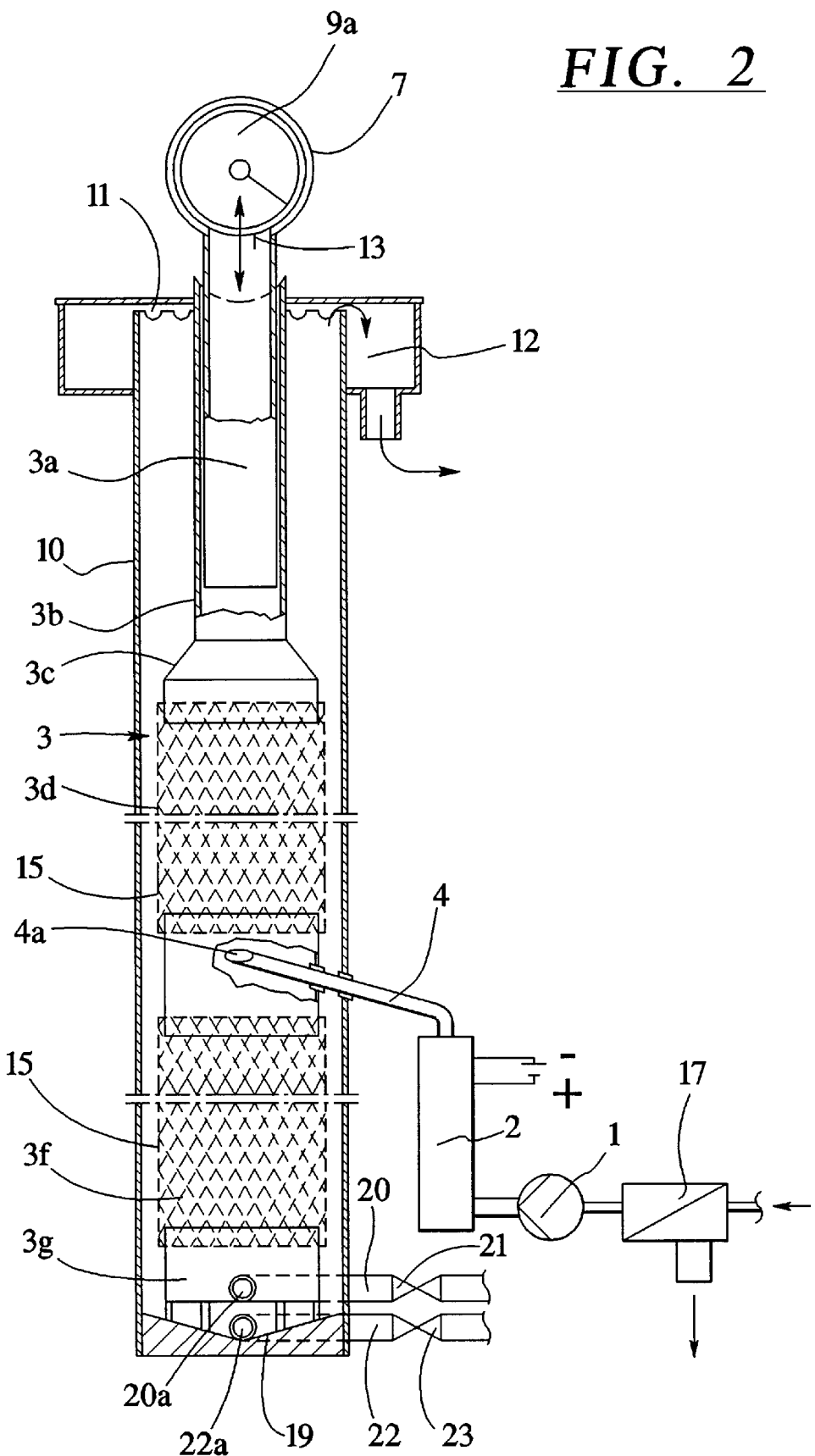
FIG. 2 depicts a further embodiment of the present invention.

A further embodiment of the present invention is depicted in FIG. 2. This embodiment has a telescopic structure, parts 3a and 3b, for the upper end of the separating pipe 3. The separating pipe 3 has a conical enlargement 3c beneath the telescopic section 3b. Beneath the conical enlargement 3c, the separating pipe 3 has a diameter (approximately 250 mm) which is close to the diameter (approximately 300 mm) of the treated water receiving and discharge tank 10.

In both upward and downward directions from the open end 4a of the supply pipe 4, the separating pipe 3 is composed of a rather coarse net of plastic material. The pipe sections 3d and 3f have net-like walls and are self supporting, that is they stiffly or slightly resiliently keep their pipe-like form. The net is very coarse so as not to create any pressure difference for flow through the net in either direction, that is, from pipe 3 to the tank 10 or vice versa.

The flock rises in the pipe section 3d, having its slippery plastic walls for controlling the flock rise upwards in the pipe 3. Since there is practically no pressure difference over the net wall, there is no tendency for the flock to flow out of the net pipe 3d, but there is some slight water flow through the net from the pipe 3 to the tank 10. The flow is also upwards toward the overflow edge 11. The heavy particles fall downwards from the supply pipe opening 4a and gather into a solid pipe section 3g at the bottom of the separating pipe 3. Heavy particles in the annular pipe space between pipe 3 and tank 10 fall onto the bottom cone 19.

By occasionally opening the valves 21 and 23 of pipes 20 and 22 respectively, for a short time, the sediment of heavy particles can be discharged via openings 20a and 22a using the hydrostatic pressure in pipe 3 and tank 10. By alternately opening the valves 21 and 23, a rather powerful flow can be created in a desired direction through the mesh apertures 15 of the net pipes 3d and 3f in order to purify the mesh openings 15. Especially when valve 21 is opened and when valve 23 is closed, the flow through the walls of net pipes 3d and 3f is reversed (from outward to inward) as compared to the flow direction during normal operation. This effectively removes conglomerated flock from the net pipes.

The total height of the pipe assembly is approximately 4500 mm. In the FIG. 1 embodiment, the separating pipe 3 has its bottom end connected to the treated water receiving and discharge tank 10. This is also valid for the FIG. 2 embodiment because of the lower net pipe 3f. However, the FIG. 2 embodiment is also fully operative with a totally closed bottom end (or lower section) of the separating pipe 3, the only discharge from bottom end of pipe 3 being via the pipe 20 to any discharge tank. The uppermost net pipe 3d alone would be sufficient communication between the inside of the separating pipe 3 and the treated water receiving and discharge tank (though the lower net pipe 3f). This obviously improves the efficiency of separation of the flock and water.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A flock separating apparatus for use in sewage or sludge treatment, comprising:

an electrolytic cell and a separating tank, into which flock developed in the electrolytic cell is delivered and in which the flock rises up through action of a gas produced in electrolysis;

the separating tank being a substantially vertical pipe assembly separated from the electrolytic cell;

the vertical pipe assembly having an upper portion and a lower portion, said upper portion having a conical enlargement section with first and second ends, said first end having a smaller diameter than a diameter of said second end, said upper portion also having first and second telescoping sections, one of said first and second telescoping sections being attached to said first end of said conical enlargement sections;

the vertical pipe assembly having a lower portion having an upper first section formed from at least a self-supporting net material, and having a lower second section attached to said upper first section, said upper first section attached to said second end of said conical enlargement section opposite from said attachment to said lower second section;

diameters of said upper and lower portions of said vertical pipe assembly being in a range of 100–500 mm such that the diameter of said lower portion is less than a diameter of said separating tank by only a predetermined small value, said diameter of said lower portion being close in value to said diameter of said tank;

said vertical pipe having a length in a range of 2000–10,000 mm, the length being at least 10 time greater than the diameter of said upper section;

a supply pipe extending from the electrolytic cell to the separating pipe, the supply pipe opening below a midpoint of the separating pipe, said separating pipe having its bottom end connected to a treated-water receiving and discharge tank and its top end rising above a surface level of said receiving and discharge tank and being connected to a substantially horizontal flock discharge pipe provided with a conveyor, the flock discharge pipe being connected to a solids separator for removing liquid from the flock.

2. The flock separating apparatus as set forth in claim 1, wherein the tank has a diameter of approximately 300 mm and wherein the diameter of the lower portion of the vertical pipe assembly is approximately 250 mm.

3. The vertical pipe assembly as set forth in claim 1, wherein the lower second section of the lower portion of the vertical pipe assembly is formed from at least a self-supporting net material.

4. The vertical pipe assembly according to claim 3, wherein the net material has a coarseness such that there is no substantial pressure difference for a flow through the net in either direction from the vertical pipe assembly to the tank or vise-versa.

5. The vertical pipe assembly as set forth in claim 1, wherein a height of the vertical pipe assembly is approximately 4500 mm.

6. The flock separating apparatus as set forth in claim 1, wherein said supply pipe opens into the bottom end of the separating pipe or a location along the separating pipe whose distance from the bottom end of the separating pipe is approximately ½–⅛ of the length of the separating pipe, and wherein a top end of the separating pipe is located on a higher level than the surface level in the receiving and discharge tank.

7. The flock separating apparatus as set forth in claim 1, wherein the separating pipe has its bottom end fitted with a sand filter.

8. The flock separating apparatus as set forth in claim 1, wherein said supply pipe is connected to a cone included in the separating pipe, a bottom of said cone opening into a discharge pipe for heavy objects.

* * * * *